US010521855B2

(12) United States Patent
Cao

(10) Patent No.: US 10,521,855 B2
(45) Date of Patent: Dec. 31, 2019

(54) METHOD, DEVICE, AND COMPUTER PROGRAM PRODUCT FOR SEARCHING AND DISPLAYING PRODUCT IMAGES

(71) Applicant: Alibaba Group Holding Limited, George Town (KY)

(72) Inventor: Yang Cao, Hangzhou (CN)

(73) Assignee: Alibaba Group Holding Limited (KY)

( * ) Notice: Subject to any disclaimer, the term of this patent is extended or adjusted under 35 U.S.C. 154(b) by 795 days.

(21) Appl. No.: 14/591,360

(22) Filed: Jan. 7, 2015

(65) Prior Publication Data
US 2015/0193863 A1    Jul. 9, 2015

(30) Foreign Application Priority Data

Jan. 9, 2014 (CN) .......................... 2014 1 0010720

(51) Int. Cl.
*G06Q 30/00* (2012.01)
*G06Q 30/06* (2012.01)
*G06K 9/62* (2006.01)
*G06F 16/51* (2019.01)

(52) U.S. Cl.
CPC ......... *G06Q 30/0643* (2013.01); *G06F 16/51* (2019.01); *G06K 9/6215* (2013.01); *G06Q 30/0623* (2013.01); *G06Q 30/0629* (2013.01)

(58) Field of Classification Search
CPC . G06Q 30/0601–0645; G06Q 30/0643; G06Q 30/0629; G06Q 30/0623; G06K 9/6215; G06F 16/51
USPC ................................................. 705/26.1–27.2
See application file for complete search history.

(56) References Cited

U.S. PATENT DOCUMENTS

| 5,893,095 | A | 4/1999 | Jain et al. |
| 5,987,456 | A | 11/1999 | Ravela et al. |
| 6,026,411 | A | 2/2000 | Delp |
| 6,345,274 | B1 | 2/2002 | Zhu et al. |
| 6,445,822 | B1 | 9/2002 | Crill |
| 6,728,706 | B2 | 4/2004 | Aggarwal et al. |

(Continued)

FOREIGN PATENT DOCUMENTS

| CN | 101189608 | 5/2008 |
| CN | 103412937 | 11/2013 |
| CN | 103489008 | 1/2014 |

OTHER PUBLICATIONS

Basu, Saikat. How to Find Similar Images Using Google's Image Search. Apr. 13, 2011 (Apr. 13, 2011). Published by MUD. (Year: 2011).*

(Continued)

*Primary Examiner* — Jeffrey A. Smith
*Assistant Examiner* — Allison G Wood
(74) *Attorney, Agent, or Firm* — Van Pelt, Yi & James LLP

(57) ABSTRACT

Embodiments of the present application relate to a method and system searching for and displaying product images to a user. The method includes acquiring an initial product image set for a user, wherein the initial product image set includes a product image corresponding to a product purchased by the user, a product image characterized as interesting by the user, a product image bookmarked by the user, or a combination thereof; searching for product images that are similar in one or more characteristics to initial product images in the initial product image set; and sending found product images to be displayed to the user.

21 Claims, 10 Drawing Sheets

(56) References Cited

U.S. PATENT DOCUMENTS

| | | | |
|---|---|---|---|
| 8,429,173 | B1 | 4/2013 | Rosenberg et al. |
| 8,620,092 | B2 | 12/2013 | Barkol et al. |
| 8,909,626 | B2 | 12/2014 | Park et al. |
| 2004/0267740 | A1* | 12/2004 | Liu .................. G06F 17/30256 |
| 2005/0234881 | A1* | 10/2005 | Burago ............... G06F 16/3325 |
| 2007/0288432 | A1* | 12/2007 | Weltman ........... G06F 17/30247 |
| 2013/0083999 | A1 | 4/2013 | Bhardwaj et al. |
| 2013/0167059 | A1* | 6/2013 | Legris ................... G06F 3/0482 |
| | | | 715/769 |
| 2013/0185288 | A1* | 7/2013 | Nishiyama ........ G06F 17/30247 |
| | | | 707/722 |
| 2013/0251273 | A1* | 9/2013 | Westphal ............. G06K 9/6201 |
| | | | 382/218 |
| 2014/0105466 | A1* | 4/2014 | Botes ................. G06K 9/00221 |
| | | | 382/118 |
| 2014/0188855 | A1 | 7/2014 | Vuong et al. |

OTHER PUBLICATIONS

Falchi et al. "Caching content-based queries for robust and efficient image retrieval." Proceedings of the 12th International Conference on Extending Database Technology: Advances in Database Technology. ACM, 2009.

Liu et al. "A survey of content-based image retrieval with high-level semantics." Pattern Recognition 40.1 (2007): 262-282.

Datta et al. "Content-based image retrieval: approaches and trends of the new age." Proceedings of the 7th ACM SIGMM international workshop on Multimedia information retrieval. ACM, 2005.

* cited by examiner

METHOD, DEVICE, AND COMPUTER PROGRAM PRODUCT FOR SEARCHING AND DISPLAYING PRODUCT IMAGES

CROSS REFERENCE TO OTHER APPLICATIONS

This application claims priority to People's Republic of China Patent Application No. 201410010720.6 entitled A METHOD AND A DEVICE FOR SEARCHING FOR AND DISPLAYING PRODUCT IMAGES, filed Jan. 9, 2014 which is incorporated herein by reference for all purposes.

FIELD OF THE INVENTION

The present application relates a method, a device, and a system for searching for and displaying product information. More specifically, the present application relates to a method, a device, and a system for searching for and displaying product images.

BACKGROUND OF THE INVENTION

As e-commerce develops, an increasing number of users are buying products through online shopping platforms. Online shopping platforms use various methods of searching for product images and displaying the product images to allow users to quickly look up the products that the users desire.

According to some related art, the method of searching for and displaying product images includes acquiring product search keywords or product filter conditions input by the user, searching for product images related to the product search keywords or product filter conditions, and displaying the product images that correspond to the search results associated with the search for product images.

Existing methods of searching for and displaying product images according to the related art typically require the use of product search keywords or product filter conditions to search for and display product images. The product search keywords or product filter conditions are text information such as product titles or attributes. In the case of apparel, luggage, shoes, and other products lacking standard specifications, describing or otherwise characterizing such items in order to include all of the features thereof using textual information is very difficult. Therefore, existing methods of searching for and displaying product images according to the related art return product images that often fail to meet user expectations, and such product images have low correlations to a user's desired product.

The above information is presented as background information only to assist with an understanding of the present disclosure. No determination has been made, and no assertion is made, as to whether any of the above might be applicable as prior art with regard to the present disclosure.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

Figure 1A:
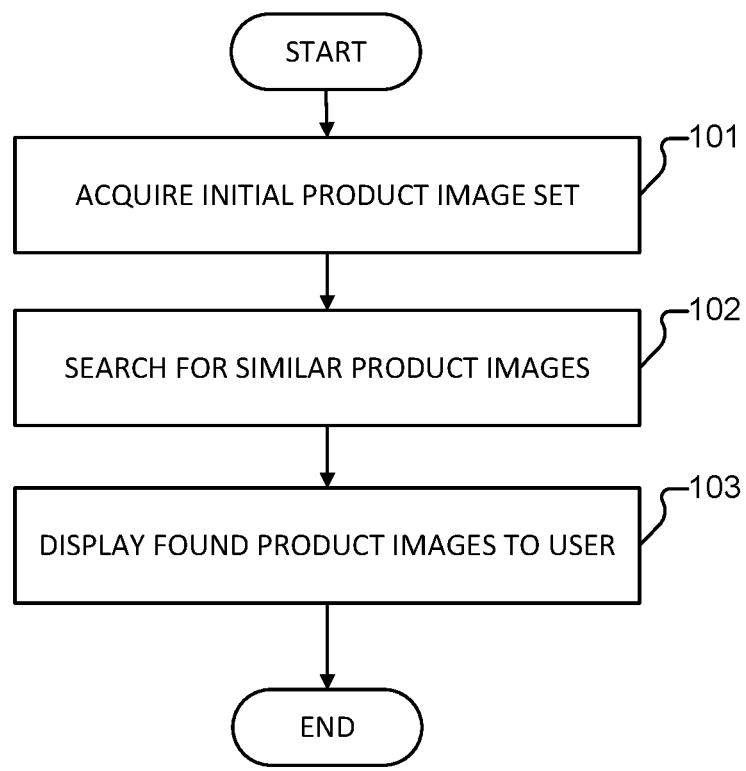
FIG. 1A is a flowchart of a method for searching for and displaying product images according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to various embodiments of the present disclosure, an electronic device that includes communication functionality is described. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be a piece of furniture, part of a building/structure, an electronic board, an electronic signature receiving device, a projector, various measuring devices (e.g., water, electricity, gas, or electro-magnetic wave measuring devices), and/or the like that include communication functionality.

According to various embodiments of the present disclosure, an electronic device may be any combination of the foregoing devices. In addition, it will be apparent to one having ordinary skill in the art that a terminal according to various embodiments of the present disclosure is not limited to the foregoing devices.

FIG. 1A is a flowchart of a process for searching for and displaying product images according to various embodiments of the present application.

Referring to FIG. 1A, a process 100 for searching for and displaying product images is provided. In some embodiments, the process 100 is implemented by a system such as system 400 illustrated in FIG. 4, or an electronic device such as device 500 illustrated in FIG. 5A.

At 101, an initial product image set is acquired. In some embodiments, an electronic device (e.g., a server) acquires an initial product image set for a user. For example, the initial product image set includes one or more product images corresponding to products purchased by the user, product images selected (or otherwise identified) as being interesting by the user, product images bookmarked by the user, and/or the like.

According to various embodiments of the present disclosure, the electronic device acquires an initial product image set for a user by collecting product images corresponding to products purchased (e.g., by or for the user) within a preset time interval (e.g., one week, one month, one year, or the like). As an example, the electronic device acquires an initial product image set for a user by collecting product images corresponding to bookmarked product images. In some embodiments, the electronic device collects the product images corresponding to bookmarked product images within a preset time interval (e.g., one week, one month, one year, or the like). According to various embodiments of the present disclosure, the electronic device acquires an initial product image using a product image interface that is a part of an application installed at the electronic device (e.g., a TMALL app or TAOBAO app installed on a mobile device running iOS). For example, a product image interface allows (or otherwise enables) a user to select from the product images displayed on the product image interface those product images that are of interest to the user and/or those product images that are not of interest to the user. Thus, the product images selected as being of interest can be acquired.

According to various embodiments of the present disclosure, product images included in the initial product image set are product images for the initial search. Accordingly, the product images included in the initial product image set can be referred to as initial product images.

According to various embodiments of the present disclosure, the initial product image set for a user is denoted by Equation 1.

$$S_R = \{R_1, R_2, \ldots R_n\} \quad \text{Equation (1)}$$

Referring to Equation 1, n is an integer that represents the number of images in the initial product set for the user. In the acquired initial product image set for the user $S_R$, $R_1$, $R_2$, ...., $R_n$, indicate the identifying (ID) numbers of the corresponding initial product images.

At 102, a search is performed to find similar product images. In some embodiments, the electronic device (e.g., a server) searches for product images that are similar to at least one of the initial product images in the initial product image set. There are many techniques for determining a similarity between product images (e.g., for determining whether a product images is similar to at least one of the initial product images in the initial product image set) that are known in the art, and any appropriate technique can be used. For example, the electronic device searches for product images that are similar according to a characteristic such as color, style, texture and/or the like. In some embodiments, the electronic device searches for product images that are similar to initial product images in the initial product image set according to a similarity threshold. For example, product images that exceed a similarity threshold relative to one or more of the initial product images in the initial product image set are determined to be product images that are similar.

Figure 1B:
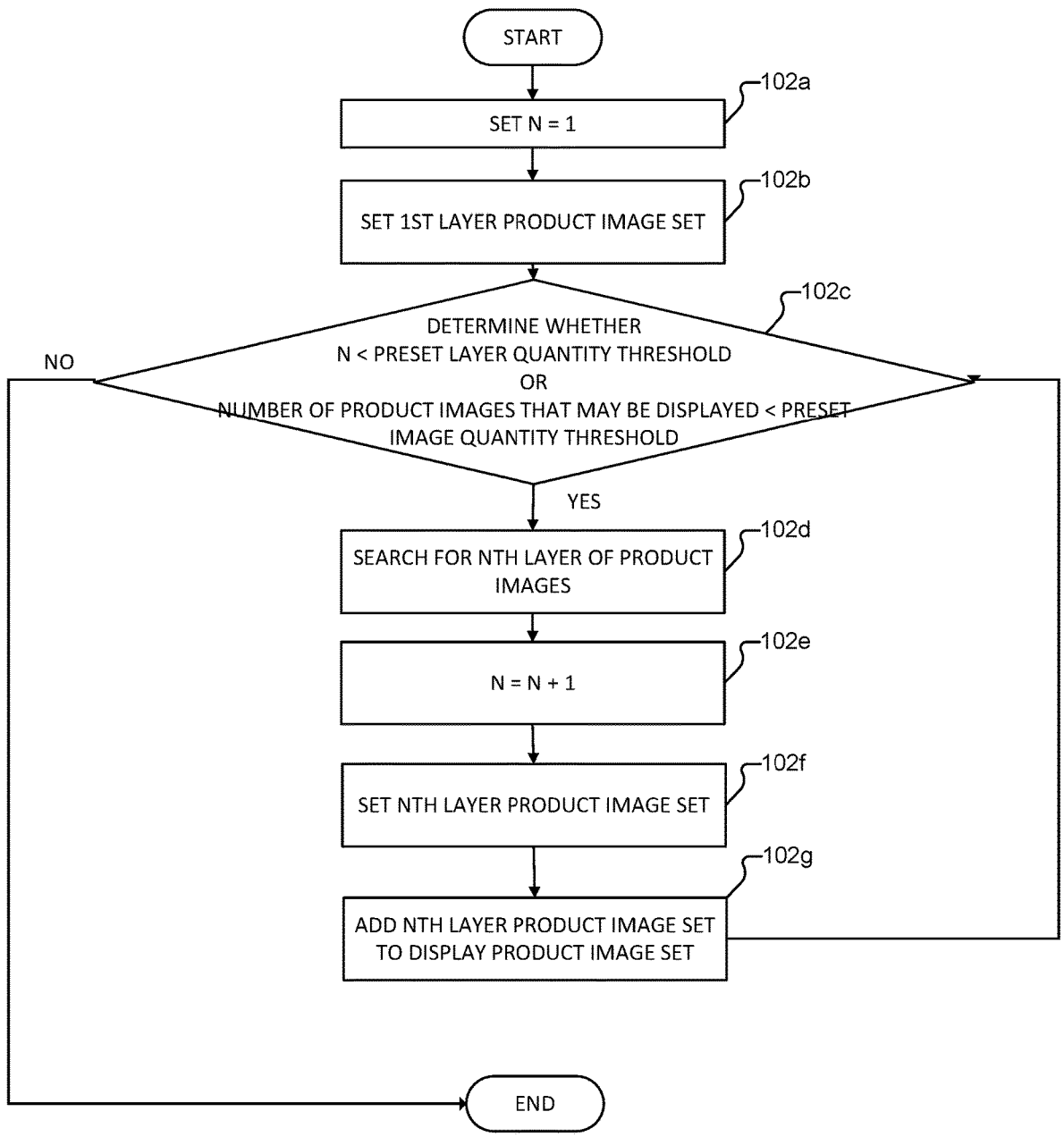
FIG. 1B is a flowchart of a method for searching for product images that are similar to an initial product image according to various embodiments of the present application.

In some embodiments, the electronic device (e.g., the server) searches for product images that are similar to at least one of the initial product images in the initial product image set using the process 102 illustrated in FIG. 1B.

FIG. 1B is a flowchart of a process for searching for product images that are similar to an initial product image according to various embodiments of the present disclosure.

Referring to FIG. 1B, an embodiment of a process 102 for searching for product images that are similar to an initial product image in the initial product image set is provided. In some embodiments, the process 102 is implemented by a system such as system 400 illustrated in FIG. 4, or an electronic device such as device 500 illustrated in FIG. 5A.

In some embodiments, the process 102 illustrated in FIG. 1B corresponds to 102 of FIG. 1A.

In some embodiments, the search for product images that are similar to an initial product image in the initial product image set includes a search for product images that are similar in a characteristic to one or more initial product images in the initial product image set. For example, the search for product images that are similar to an initial product image in the initial product image set includes a search for product images that are similar in one or more of color, style, texture and/or the like to initial product images in the initial product image set. In some embodiments, determination as to whether a product image is similar in one or more characteristics to one or more initial product images in the initial product image set is made according to a similarity threshold. In some embodiments, the similarity threshold is preset. In some embodiments, the similarity threshold is configurable according to search parameters, user preferences, and/or the like. According to various embodiments of the present disclosure, the similarity threshold corresponds to an extent to which two particular images are similar.

At 102a, a variable N is set. For example, according to various embodiments of the present disclosure, N corresponds to a search layer number, and is set to 1 initially. In some embodiments, the electronic device (e.g., the server) sets the value of N.

At 102b, the first layer product image set is configured. In some embodiments, the electronic device (e.g., the server) configures (e.g., sets) the first layer product image set. As an example, the electronic device sets the first layer product image set to be the initial product image set. According to various embodiments of the present disclosure, the electronic device may sequentially regard the initial product images in the initial product image set as current initial product images (e.g., the electronic device may use the current initial product images as a source for Nth layer product images set).

At 102c, a determination is made as to whether N is less than a preset layer quantity threshold and/or whether the number of product images that can be displayed is less than a preset image quantity threshold. In some embodiments, the electronic device determines whether N is less than a preset layer quantity threshold and/or whether the number of product images that can be displayed is less than a preset image quantity threshold. For example, the electronic device determines whether the search layer number of the current initial product images is less than a preset layer quantity threshold value and/or whether the number of product images that can be displayed is less than a preset image quantity threshold value. In some embodiments, the preset layer quantity threshold value is set to 3. Accordingly, in some embodiments, only 3 layers of product images are displayed.

If the electronic device determines that the search layer number of the current initial product images is not less than the preset layer quantity threshold value and the number of product images that can be displayed is not less than the preset image quantity threshold value, then the process 102 ends.

In contrast, if the electronic device determines that the search layer number of the current initial product images is less than the preset layer quantity threshold value and/or the number of product images that can be displayed is less than the preset image quantity threshold value, then the process 102 may proceed to 102d.

According to various embodiments of the present disclosure, the electronic device (e.g., the server) iteratively searches for the Nth layer of product images until the condition in 102c results in the process of 102 ending. For example, the electronic device sequentially searches the Nth layer product image set for the Nth layer product images until 102 ends by virtue of the condition in 102c.

At 102d, a search is performed for the Nth layer of product images. In some embodiments, the electronic device (e.g., the server) searches for the Nth layer of product images. In some embodiments, the electronic device searches for the Nth layer of product images using the Nth layer product image set. For example, the electronic device finds the Nth layer of product images from the Nth layer product image set.

According to various embodiments of the present disclosure, during a search, the initial product images in the initial product image set can be regarded as direct search ontological objects. For example, the first layer (e.g., N=1) product image set is regarded as including direct search ontological objects. The search finds a first layer of product images having one or more characteristics that are similar to those characteristics of one or more of the initial product images in the initial product image set (e.g., the first layer product image set). As an example, an electronic device (e.g., a server) determines or otherwise selects a first layer of product images according to the images' similarity to one or more characteristics of the initial product images in the initial product image set. For example, the search finds a first layer of product images similar in one or more of color, style, texture, and/or the like to the initial product images in the initial product image set.

At 102e, N is incremented. For example, the search layer number is incremented. In some embodiments, the search layer number is incremented to enable the electronic device to set the product image set corresponding to the next layer. Thereafter, the electronic device searches for the product images for the next layer. According to various embodiments of the present disclosure, the product image set corresponding to the next layer is a set of product images from a search of a next layer of product images.

At 102f, an Nth layer product image set is configured. In some embodiments, the electronic device (e.g., the server) configures the Nth layer product image set. As another example, because the search layer number was incremented in 102e, the configuration of the Nth layer product image set corresponds to a configuration of a next layer product image set.

According to various embodiments of the present disclosure, a set of product images for a next round of search (e.g., the Nth layer product image set) includes or otherwise refers to a set of product images that are selected from images that are results (e.g., found product images) of the search of the product images such as, for example, the search of product images at 102d. In some embodiments, the set of product images for the next round of search includes product images that are selected from the found product images and that are not identified or otherwise characterized as uninteresting to the user. In some embodiments, the set of product images for the next round of search includes product images that do not correspond to or that are not otherwise characterized as current initial product images. As an example, the Nth layer product image set is configured using the results from 102d; the product images found searching for (N−1)th layer of product images are used to configure the Nth layer product image set.

According to various embodiments of the present disclosure, product images are identified or otherwise characterized as uninteresting to the user using a product image interface. For example, an electronic device (e.g., a server) configures a product image interface through which a user inputs (e.g., via a client or other terminal) an indication as to whether a particular image is interesting or uninteresting to the user. For example, the server receives, from a terminal, an indication of whether a product image is interesting to the user and/or whether a product image is uninteresting to the user. For example, when a user selects one or more product images of interest to the user from product images displayed on the product image interface (e.g., or otherwise in response to selection of one or more product images of interest to the user), the user also effectively makes a manual indication that the remaining product images from the product images displayed on the product image interface are uninteresting to the user. As another example, the server automatically determines which of the product images displayed on the product image interface are uninteresting to the user according to the product images displayed on the product image interface that are identified as being interesting to the user (e.g., the product images displayed on the product image interface that are not identified as being interesting to the user are considered to be product images that are uninteresting to the user). In some embodiments, the server determines which of the product images displayed on the product image interface are identified as being interesting to the user according to contextual information such as, for example, predefined user preferences, historical user selection, or the like. Accordingly, a set of uninteresting product images is acquired by the server. Thus, a product image is determined to be uninteresting to the user by determining whether a product image belongs to the set of uninteresting product images.

According to various embodiments of the present disclosure, an uninteresting product image set (e.g., a set of product images that are uninteresting to the user) is defined by Equation (2).

$$S_D = \{D_1, D_2, \ldots D_m\}$$  Equation (2)

Referring to Equation (2), the uninteresting product image set $S_D$ (e.g., for a corresponding layer) includes elements D1, $D_2, \ldots, D_m$. In some embodiments, elements $D_1, D_2, \ldots D_m$ indicate the identifying (ID) numbers of the product images that are uninteresting (e.g., to the user). According to various embodiments of the present disclosure, the set of product images for the next round of search does not include images corresponding to elements in the uninteresting product image set $S_D$. For example, the Nth layer product image set does not include (e.g., excludes) images that were included in the uninteresting product image set $S_D$.

According to various embodiments of the present disclosure, the set of product images for the next round of search includes product images that do not correspond to or are otherwise characterized as current initial product images (e.g., only product images that have not been regarded as current initial product images are included in the set of product images for the next round of search) in order to avoid repetitive searches on the same product images. For example, the Nth layer product image set does not include (e.g., excludes) images that were included in the (N−1)th layer product image set.

At 102g, the Nth layer product image set is added to a display product image set. In some embodiments, the product images of the next round search are regarded or otherwise specified as product images that can be displayed. In some embodiments, the display product image set is configured to include the Nth layer product image set to avoid repetitive display of same product images or a display of product images that are uninteresting to the user. In some embodiments, the server configures the display product image set.

Thereafter, the process 102 returns to 102c. For example, in response to configuring the display product image set, the server returns to 102c to determine whether to continue the search (e.g., performing a next round of search) or whether to end the process of searching for product images that are similar to an initial product image.

According to various embodiments of the present disclosure, the product images of the next round of search are selected from the first layer of product images. For example, in response to an electronic device (e.g., a server) determining or otherwise selecting a first layer of product images according to the images' similarity to one or more characteristics of the initial product images in the initial product image set, an electronic device determines or otherwise selects a second layer of product images that are similar to one or more characteristics of one or more of the first layer of product images. For example, the search finds a second layer of product images that are similar in one or more of a color, a style, a texture, and/or the like to one or more of the first layer of product images. According to various embodiments of the present disclosure, the initial product images can be regarded as indirect search ontological objects relative to the second layer of product images. As an example, the current search layer quantity can be set to 2.

According to various embodiments of the present disclosure, the product images of the next round of search are selected from the second layer of product images. An example is in response to an electronic device (e.g., a server) determining or otherwise selecting a third layer of product images according to the images' similarity to one or more characteristics of one or more of the second layer of product images. For example, the search finds a third layer of product images that are similar in one or more of a color, a style, a texture, and/or the like to one or more of the second layer of product images. According to various embodiments of the present disclosure, the initial product images can be regarded as indirect search ontological objects relative to the third layer of product images. As an example, the current search layer quantity can be set to 3.

According to various embodiments of the present disclosure, the process for searching for product images that are similar to an initial product image is carried out sequentially until the search layer quantity is greater than or equal to a preset layer quantity threshold value and/or the number of product images that can be displayed is greater than or equal to a preset image quantity threshold value. For example, the search layer quantity is a counter that is incremented with each iteration of a search for a layer of product images.

According to various embodiments of the present disclosure, a set of product images for a next round of search refers to a set of product images that are selected from found product images. The set of product images for the next round of search includes product images that are selected from the found product images and are not identified or otherwise characterized as uninteresting to the user. The set of product images for the next round of search includes product images that do not correspond to or are otherwise characterized as current initial product images. According to various embodiments of the present disclosure, product images are identified or otherwise characterized as uninteresting to the user using a product image interface. For example, an electronic device (e.g., a server) configures a product image interface through which a user may input (e.g., via a client or other terminal) an indication as to whether a particular image is interesting or uninteresting to the user. For example, the server receives, from a terminal, an indication of whether a product image is interesting to the user and/or whether a product image is uninteresting to the user. For example, when a user selects one or more product images of interest to the user from the product images displayed on the product image interface, the user can select product images from the product images displayed on the product image interface that are uninteresting to the user. As another example, the server determines which of the product images displayed on the product image interface are uninteresting to the user according to the product images displayed on product image interface that are identified as being interesting to the user (e.g., the product images displayed on the product image interface that are not identified as being interesting to the user are considered to be product images that are uninteresting to the user). Accordingly, a set of uninteresting product images is acquired by the server. Thus, a product image is determined to be uninteresting to the user by determining whether a product image belongs to the set of uninteresting product images. According to various embodiments of the present disclosure, the set of product images for the next round of search includes product images that do not correspond to or are otherwise characterized as current initial product images (e.g., only product images that have not been regarded as current initial product images are included in the set of product images for the next round of search) in order to avoid repetitive searches on the same product images. According to various embodiments of the present disclosure, an uninteresting product image set (e.g., a set of product images that are uninteresting to the user) is defined by Equation (2) above.

Referring to Equation (2), the uninteresting product image set $S_D$ includes elements $D_1, D_2, \ldots, D_m$. In some embodiments, elements $D_1, D_2, \ldots D_m$ indicate the identifying (ID) numbers of the product images that are uninteresting (e.g., to the user).

According to various embodiments of the present disclosure, the found product images are returned to the user. For example, the server sends the found product images (or links or the like associated with the found product images) to the user (e.g., to a client terminal). In some embodiments, the server sends all the found product images or a subset of the product images to the user. In some embodiments, found product images are regarded as product images that can be displayed. In some embodiments, found product images correspond to a set of product images that are selected according to the images' similarity to one or more characteristics of a set of product images that are searched for a corresponding layer (e.g., the initial product image set for a selection of the first layer of product images, the first layer of product images for a selection of the second layer of product images, the second layer of product images for a selection of the third layer of product images, and/or the like).

According to various embodiments of the present disclosure, to avoid repetitive display of same product images or display of product images uninteresting to the user, product images of the next round search can be regarded as product images that can be displayed.

According to various embodiments of the present disclosure, one or more of the preset layer quantity threshold value and the preset image quantity threshold value are set flexibly according to application conditions. For example, the preset layer quantity threshold value and the preset image quantity threshold value are configured (e.g., by the server) according to a context of an application, user preferences, quality of service, the like, or a combination thereof. No restrictions are imposed in this regard. For example, the layer quantity threshold value could be set to 2 or 3, and the image quantity threshold value could be set to 1,000.

If all initial product images have been searched and if product images of the next round search cannot be selected, then the process for searching for product images that are similar to an initial product image automatically ends. For example, if all initial product images have been searched and if product images of the next round search cannot be selected, then the process for searching for product images that are similar to an initial product image ends, regardless of the search layer quantity and/or the number of product images that can be displayed.

Referring back to 102d, in some embodiments, the electronic device (e.g., the server) searches for the Nth layer of product images. For example, the electronic device searches for product images that have a similarity to the current initial product images in one or more characteristics that is greater than or equal to a preset similarity threshold value. As another example, the electronic device searches for product images that have a similarity in one or more of a color, a style, a texture, a size, and/or the like that is greater than or equal to a preset similarity threshold value. In some embodiments, in response to (or as a result of) the search for the Nth layer of product images (e.g., the search for product images having a similarity greater than the preset similarity threshold value), the electronic device obtains a search product image set. The search product image set includes found product images and the similarities of the found product images to the Nth layer product image set. For example, for a first layer search, the search product image set includes found product images and the similarities of the found product images to the current initial product images.

Referring back to Equation 1, the initial product image set $S_R$ includes $R_1$, which indicates an identifying (ID) number of a corresponding initial product image. As an example, for $R_1$ in the initial product image set $S_R$, the obtained search product image set L1 may be defined by Equation 3.

$$L_1 = [(C_{11}, S_{11}), (C_{12}, S_{12}) \ldots (C_{1k}, S_{1k})] \qquad \text{Equation (3)}$$

Referring to Equation 3, $C_{11}$, $C_{12}$, and $C_{1k}$ represent identifying numbers for found product images. $S_{11}$, $S_{12}$, and $S_{1k}$ represent the similarities of current initial product images to found product images. For example, in some embodiments, $S_{11}$, $S_{12}$, and $S_{1k}$ represent or otherwise indicate an extent to which a one or more initial product images is to a corresponding found product image.

According to various embodiments of the present disclosure, the preset similarity threshold values are set flexibly according to application conditions. For example, one or more of the preset layer quantity threshold value and the preset image quantity are configured (e.g., by the server) according to a context of an application, user preferences, quality of service, and/or the like. No restrictions are imposed in this regard. For example, in some embodiments, the similarity threshold value is set at 60%.

Referring back to 102f, in some embodiments, the electronic device (e.g., the server) configures the Nth layer product image set. In some embodiments, the electronic device selects from the search product image set the search product images of the next round. A set of product images for a next round of search (e.g., the Nth layer product image set) refers to a set of product images that are selected from found product images. According to various embodiments of the present disclosure, the next round search product images refer to product images that are not identified or otherwise characterized as uninteresting to the user and have not been regarded as current initial product images.

Referring back to 102g, in some embodiments, the electronic device (e.g., the server) adds the selected next round search product images to the display product image set, and sequentially regards the selected next round search product images as current initial product images. Thereafter, the electronic device execute returns to 102c to determine whether a corresponding condition is satisfied and whether to end the process for searching for product images that are similar to an initial product image in the initial product image set.

According to various embodiments of the present disclosure, in order to facilitate rapid and accurate selection of the next round search product images, identifying numbers (or other indicia) of selected next round search product images are added or otherwise associated to the uninteresting product image set. For example, the electronic device (e.g., the server) adds the identifying numbers of selected next round search product images to the uninteresting product image set. When the next selection occurs, the electronic device determines whether product images are product images uninteresting to the user and whether such product images have been regarded as current initial product images. For example, the electronic device determines whether the product images are product images uninteresting to the user and/or have been regarded as current initial product images by whether a product image in the search product image set belongs to the uninteresting product image set.

The electronic device (e.g., a server) searches for product images that are similar to at least one of the initial product images in the initial product image set. In some embodiments, the search for product images that are similar to at least one of the initial product images in the initial product image set includes searching for product images that are similar according to a characteristic such as a color, a style, a texture, a shape, the like, or a combination thereof. In some embodiments, the electronic device searches for product images that are similar to initial product images in the initial product image set according to a similarity threshold. For example, product images that exceed a similarity threshold relative to one or more of the initial product images in the initial product image set are determined to be product images that are similar.

According to various embodiments of the present disclosure, a search for product images whose similarity in a color, a style, a texture, and/or the like to the current initial product images is greater than or equal to a preset similarity threshold value, obtaining the search product image set includes using a preset color, a preset style, a preset texture, and/or the like search method to perform an online search for product images having a similarity in color, style, texture, and/or the like to the current initial product images (e.g., the Nth layer product image set) that is greater than or equal to a preset similarity threshold value and obtaining the search product image set.

According to various embodiments of the present disclosure, a search for product images whose similarity in a color, a style, a texture, and/or the like to the current initial product images is greater than or equal to a preset similarity threshold value, obtaining the search product image set includes using identifying numbers of the current initial product images (e.g., the Nth layer product image set) as a basis for searching a similar product image cache library for product images having a similarity in a color, a style, a texture, and/or the like to the current initial product images that is greater than or equal to a preset similarity threshold value and obtaining the search product image set. As an example, the similar product image cache library stores previously searched and found information on product images that are similar in a color, a style, a texture, and/or the like.

According to various embodiments of the present disclosure, various colors, styles, textures, shapes, and/or the like are used for online real-time searches. For example, any feasible color, style, and/or texture search method is used for online real-time searches. In some embodiments, a terminal (e.g., a user) sends, to a server, a selection of one or more of a color, a style, a texture, a shape, and/or the like to be used for an online real-time search. For example, the server queries the terminal for a selection of the one or more of a color, a style, a texture, a shape, and/or the like to be used for an online real-time search.

According to various embodiments of the present disclosure, an electronic device associates identifying numbers (or other indicia) of current initial product images (e.g., product images in the Nth layer product image set). In some embodiments, the electronic device stores the identifying numbers (or other indicia) of the current initial product images. In some embodiments, identifying numbers are used to conduct searches of information cached in similar product image cache banks.

Referring back to FIG. 1A, in some embodiments, at 103, the electronic device provides the found product images to another electronic device (e.g., a terminal such as a terminal used by the user). The server may send (or otherwise provide access to) the found product images to the terminal over a communication network such as the Internet.

As an example, the server operatively displays the found product images to the user. For example, the server operatively displays the product images in the display product image set to the user. As another example, the server operatively displays a subset of the product images in the display product images set to the user.

According to various embodiments of the present disclosure, the server operatively displays the product images in the display product image set to the user by selecting a preset number of product images sequentially in turns from among product images corresponding to each initial product image in the display product image set and forming (e.g., generating) a product image list. In some embodiments, the product images corresponding to each initial product image refer to a series of product images obtained by searching each initial product image as a direct search ontological object or an indirect search ontological object. Thereafter, the server operatively displays the product images in the product image list to the user. In some embodiments, some of the displayed products may be selected (e.g., a user can click or buy one or more of the displayed products). In some embodiments, because the initial product set is defined by user, and because the user can refine the final product list by interactive operations such as by characterizing uninteresting products, there is a higher probability that products from this product list will be selected (e.g., a user clicking or buying one or more of the products) than other lists from other traditional methods.

According to various embodiments of the present disclosure, the electronic device (e.g., the server) configures the preset number of product images. In some embodiments, the preset number of product images are configured (e.g., by the server) according to a context of an application, user preferences, quality of service, the like, or a combination thereof. The preset number of product images can be selected according to actual application conditions. No restrictions are imposed in this regard. As an example, the preset number of product images could be ten. Moreover, in selecting a preset number of product images sequentially in turn, if no product image is available among the product images corresponding to a certain initial product image, then a certain initial product image is omitted.

In some embodiments, the method for searching for and displaying product images includes acquiring an initial product image set for a user, conducting a search for product images that are similar in a color, a style, and/or a texture, and/or the like to initial product images in an initial product image set, and displaying the found product images to the user. In this method, the initial product image set comprises images which meet user expectations and that, during the search, are based on information such as a color, a style, a texture, and/or the like. The information such as the color, the style, the texture, the like, or a combination thereof on which the initial product image set is based is highly related to the product images, thus increasing the relatedness of the product images that are searched for and displayed. A preset number of product images are selected sequentially in turns from product images corresponding to each initial product image in the display product image set. A product image list is formed, and the product images in the product image list are displayed to the user. The product images are displayed in uniform fashion, thus enhancing the product image display effect.

Figure 2:
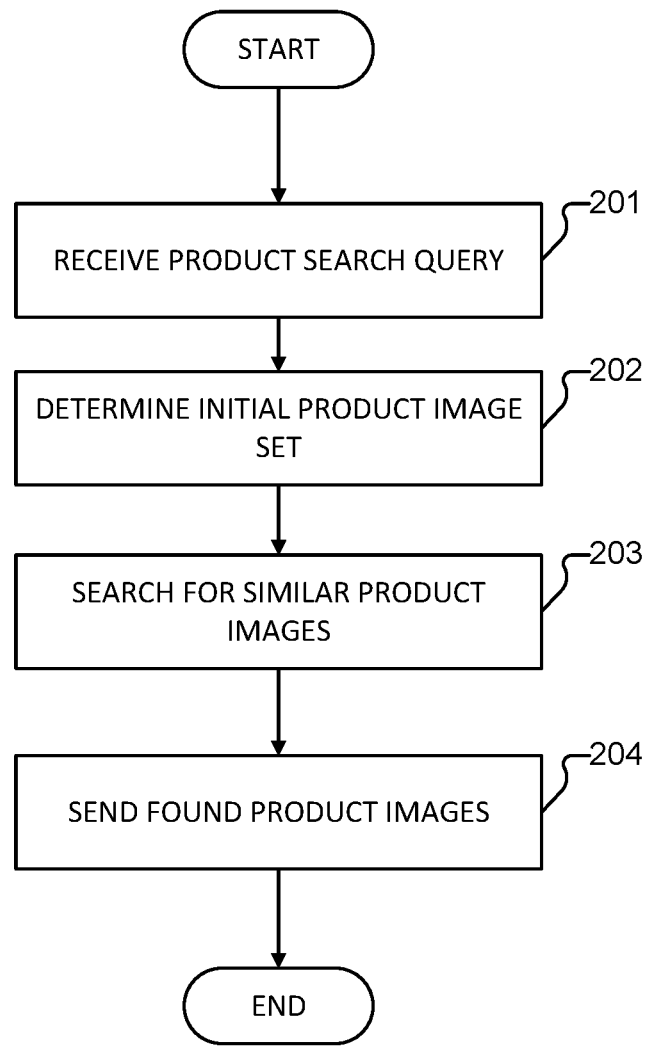
FIG. 2 is a flowchart of a method for searching for and displaying product images according to various embodiments of the present application.

FIG. 2 is a flowchart of a process for searching for and displaying product images according to various embodiments of the present disclosure.

Referring to FIG. 2, a process 200 for searching for product images that are similar to an initial product image in the initial product image set is provided. In some embodiments, the process 200 is implemented by an electronic device such as device 500 illustrated in FIG. 5A.

At 201, a product search query is received. In some embodiments, an electronic device (e.g., a server) receives a product search query. For example, the server receives a product search query from a terminal (e.g., a terminal being operated by a user). In some embodiments, the product search query includes parameters associated with a product search. In some embodiments, product search parameters include a product name, a brand name, a color, a size, a shape, a texture, and/or the like of a product. In some embodiments, the server receives the product search query from the terminal via a communication network (e.g., the internet, and/or the like). In some embodiments, the server receives a product search query from a workflow associated with providing a user a recommended product based on one or more characteristics associated with the user (e.g., products purchased by the user, product images selected or otherwise identified as being interesting by the user, product images bookmarked by the user, and/or the like). In some embodiments, the server receives input from a terminal (e.g., a user) relating to an interest in a product. In some embodiments, the server receives input from the terminal via a product image interface.

At 202, an initial product image set is determined. In some embodiments, the electronic device (e.g., the server) determines an initial product image set. For example, the server acquires the initial product set based on the determination of the images included in the initial product image set.

At 203, a search for product images that are similar to an initial product image is performed. In some embodiments, the electronic device (e.g., the server) searches for product images that are similar to at least one of the initial product images in the initial product image set. In some embodiments, the electronic device (e.g., the server) searches for product images that are similar to at least one of the initial product images in the initial product image set using the process 102 illustrated in FIG. 1B. In some embodiments, the server receives feedback from the user as to an interest level of a user (e.g., whether a user is interested) in relation to a product image.

At 204, found product images may be communicated. In some embodiments, the electronic device (e.g., the server) sends the found product images to a terminal (e.g., to the user). In some embodiments, the server sends a subset of the found product images to the user. In some embodiments, the server sends one or more of the found product images to the terminal via the product image interface.

Figure 3:
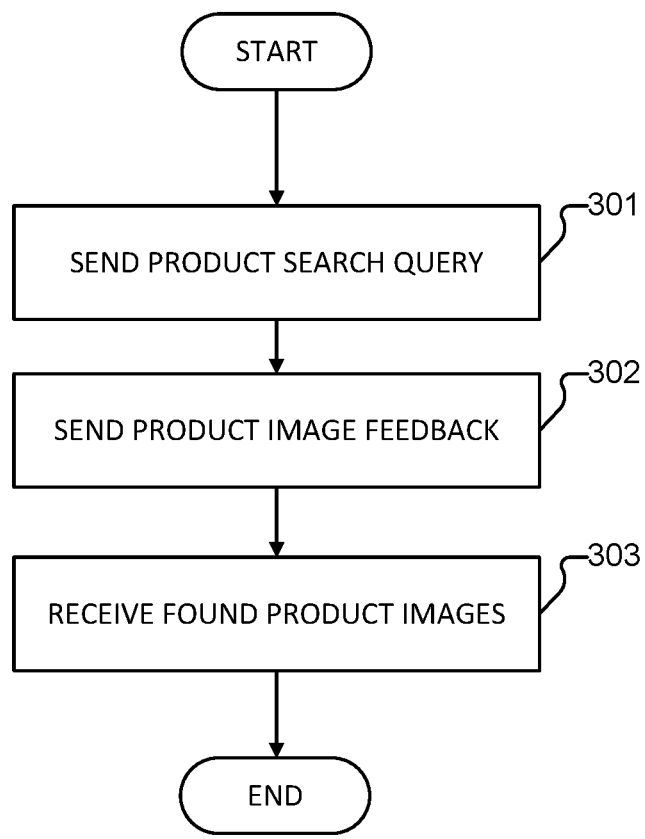
FIG. 3 is a flowchart of a method for searching for and displaying product images according to various embodiments of the present application.

FIG. 3 is a flowchart of a process for searching for and displaying product images according to various embodiments of the present application.

Referring to FIG. 3, a process 300 for searching for product images that are similar to an initial product image in the initial product image set is provided. In some embodiments, the process 300 is implemented by an electronic device such as device 600 illustrated in FIG. 6.

At 301, a product search query is sent. In some embodiments, an electronic device (e.g., a terminal used by a user) sends a product search query. For example, the terminal sends the product search query to a server. In some embodiments, the product search query includes parameters associated with a product search. In some embodiments, product search parameters include a product name, a brand name, a color, a size, a shape, a texture, the like, or a combination thereof of a product. In some embodiments, the terminal sends the product search query to the server via a communication network (e.g., the internet, and/or the like). In some embodiments of the present disclosure, the product search query corresponds to a product search. In some embodiments of the present disclosure, the product search query corresponds to a terminal sending one or more characteristics associated with the user (e.g., products purchased by the user, product images selected or otherwise identified as being interesting by the user, product images bookmarked by the user, and/or the like). In some embodiments, the terminal sends, to the server, input relating to an interest in a product. In some embodiments, the terminal sends input to the server via a product image interface.

At 302, product image feedback is communicated. In some embodiments, the terminal sends product image feedback. For example, the terminal sends product image feedback to the server. In some embodiments, the terminal sends the product image feedback via the product image interface. In some embodiments, the terminal sends product image feedback in response to receiving one or more product images (e.g., found product images) that the terminal receives from the server. For example, the terminal sends the product image feedback while the server searches for similar product images.

At 303, found product images are received. In some embodiments, the terminal receives found product images. For example, the terminal receives the found product images from the server. In some embodiments, the terminal receives a subset of the found product images from the server. In some embodiments, the terminal receives one or more of the found product images from the server via the product image interface.

Figure 4:
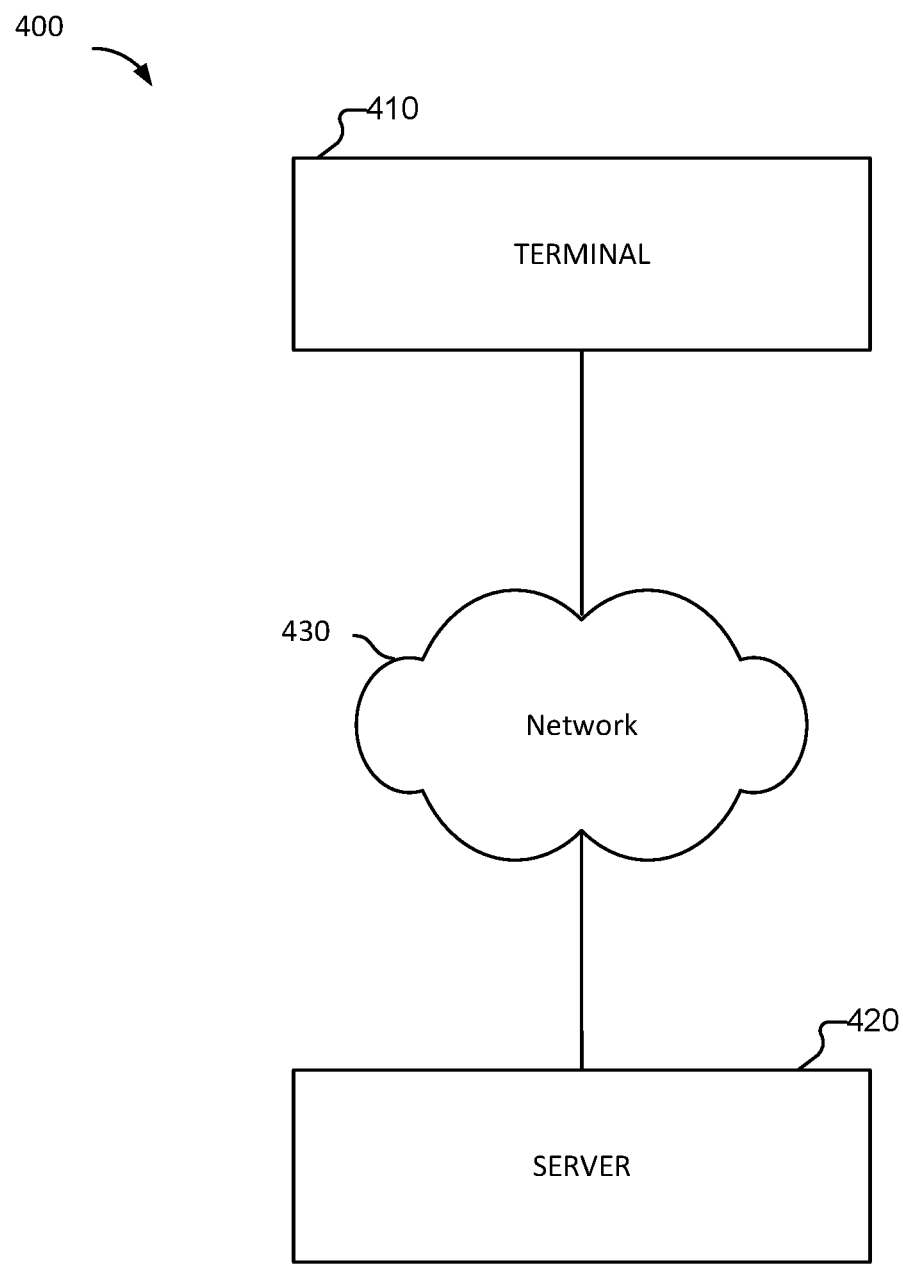
FIG. 4 is a diagram illustrating a system for searching for and displaying product images according to various embodiments of the present application.

FIG. 4 is a diagram illustrating a system for searching for and displaying product images according to various embodiments of the present disclosure.

Referring to FIG. 4, the system for searching for and displaying product images includes a terminal 410, a server 420, and a network 430. As illustrated in FIG. 4, the terminal 410 communicates with the server 420 across the network 430.

In some embodiments, the terminal 410 sends a product search query to a server. In some embodiments, the terminal sends product image feedback. For example, the terminal 410 sends product image feedback regarding one or more product images that the terminal 410 receives from the server 420. In some embodiments, the terminal 410 receives found product images. For example, the terminal 410 receives the found product images from the server 420. In some embodiments, the terminal 410 receives a subset of the found product images from the server 420. The terminal 410 receives one or more of the found product images from the server 420 via the product image interface.

In some embodiments, the server 420 receives a product search query. In some embodiments, in response to the product search query, the server 420 determines an initial product image set. In some embodiments, the server 420 acquires the initial product set based on the determination of the images included in the initial product image set. In some embodiments, the server 420 searches for similar product images. In some embodiments, the server 420 searches for product images that are similar to at least one of the initial product images in the initial product image set. In response to finding one or more product images that are similar to at least one of the initial product images in the initial product image set, the server 420 sends the found product images. For example, the server 420 sends the found product images to the terminal 410 (e.g., to a user). The server 420 receives input relating to an interest in a product from the terminal 410. The server 420 receives input from the terminal 410 via a product image interface.

Figure 5A:
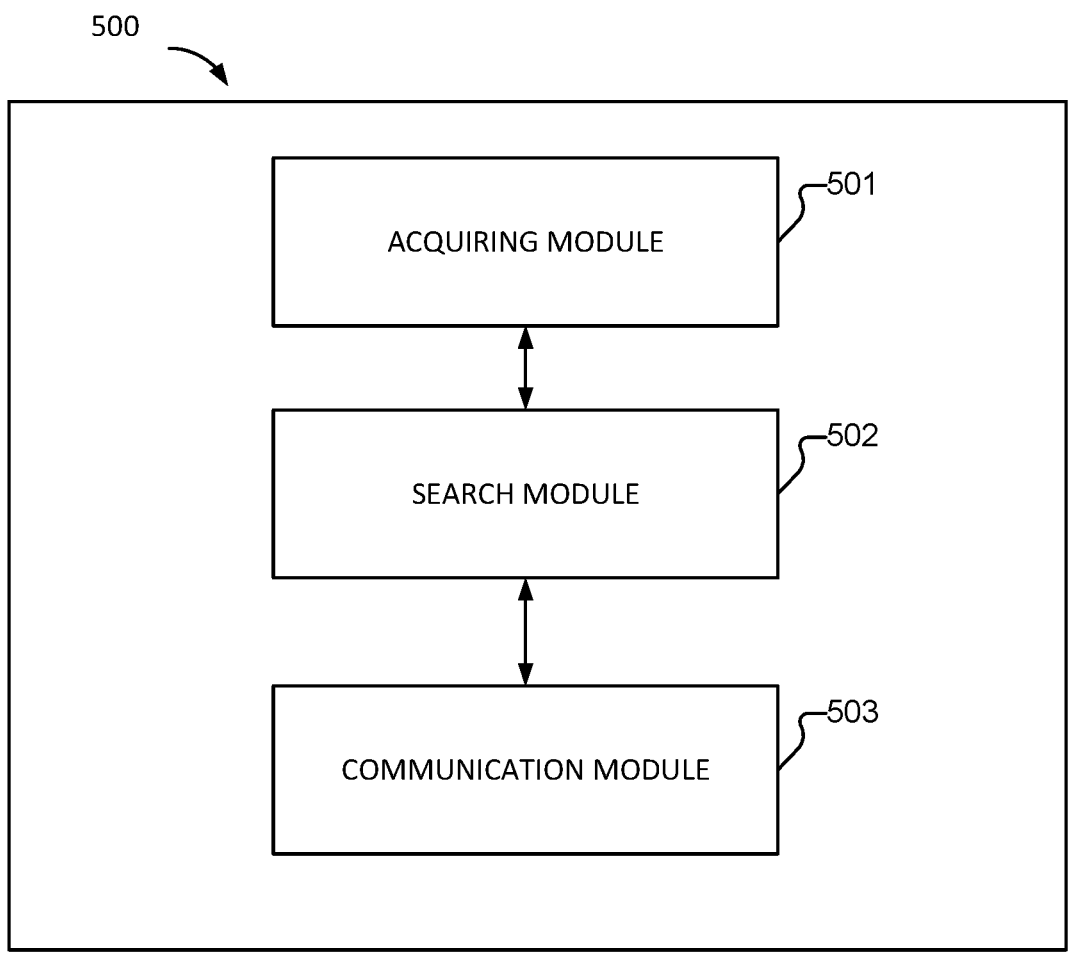
FIG. 5A is a structural diagram of a server for searching for and displaying product images according to various embodiments of the present application.

FIG. 5A is a structural diagram of a server for searching for and displaying product images according to various embodiments of the present application.

Referring to FIG. 5A, a server 500 for searching for and displaying product images is provided. In some embodiments, the server 500 implements process 100 illustrated in FIG. 1A, and/or process 200 illustrated in FIG. 2.

In some embodiments, the server 500 that searches for and displays product images includes an acquiring module 501, a search module 502, a communication module 503, and/or the like.

According to various embodiments of the present disclosure, the acquiring module 501 acquires an initial product image set. For example, the acquiring module 501 acquires an initial product image set for a user. In some embodiments, initial product image includes product images corresponding to products purchased by the user, product images selected as interesting by the user, product images bookmarked by the user, and/or the like.

According to various embodiments of the present disclosure, the search module 502 searches for product images that are similar in a characteristic to one or more initial product images in the initial product image set. For example, the search module 502 searches for product images that are similar in one or more of a color, a style, a shape, a size, a texture, and/or the like to one or more initial product images in the initial product image set.

Figure 5B:
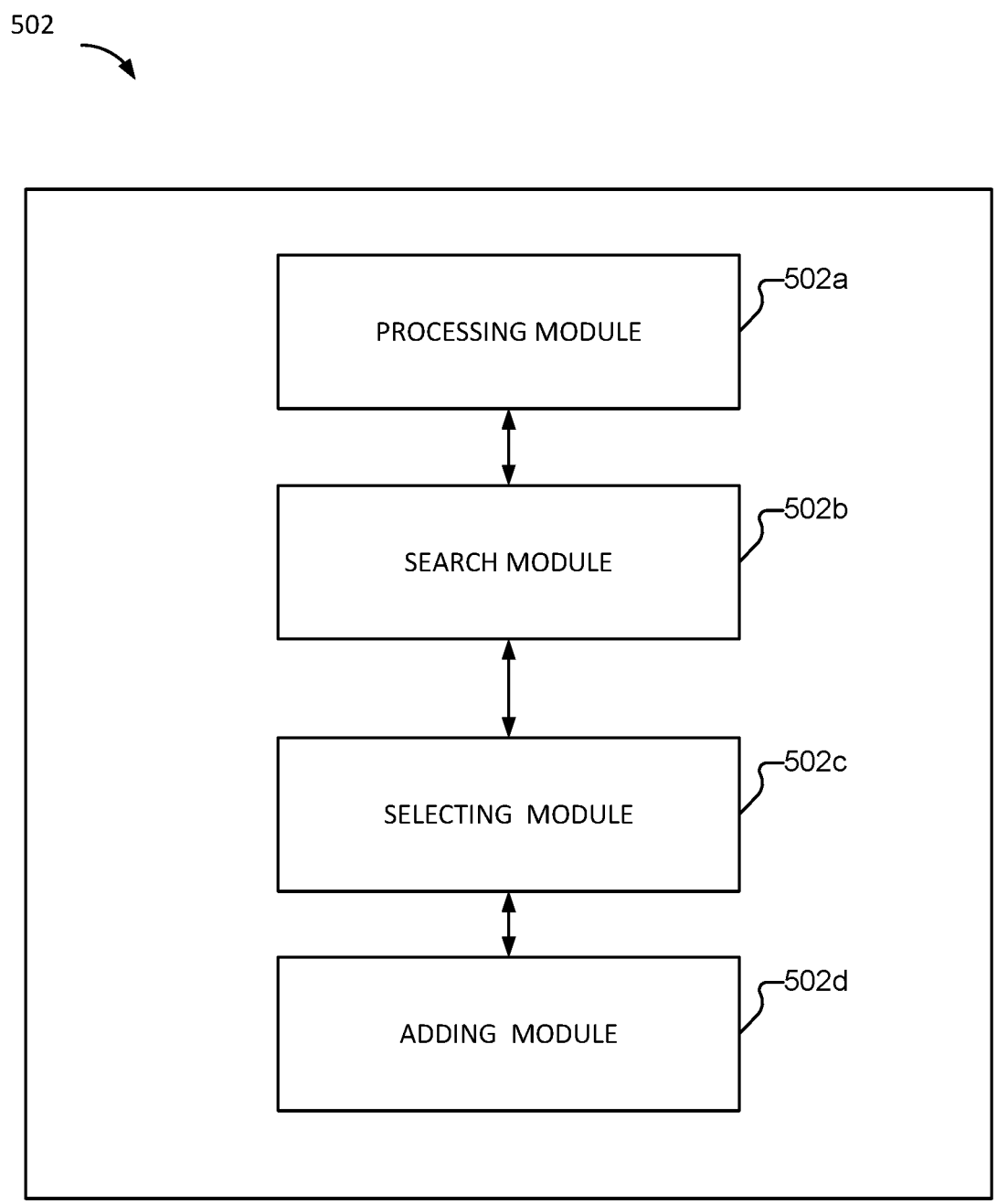
FIG. 5B is a structural diagram of a search module of a device for searching for and displaying product images according to various embodiments of the present application.

FIG. 5B is a structural diagram of a search module of a device for searching for and displaying product images according to various embodiments of the present application.

Referring to FIG. 5B, a search module 502 of a device for searching for and displaying product images is provided. In some embodiments, the search module 502 corresponds to search module 502 illustrated in FIG. 5A.

In some embodiments, the search module 502 includes a processing module 502a, a search sub-module 502b, a selecting module 502c, and an adding module 502d.

According to various embodiments of the present disclosure, the processing module 502a sequentially regards or otherwise specifies the initial product images in the initial product image set as current initial product images. In some embodiments, the processing module 502a sets or otherwise configures the Nth layer product image set. For example, the processing module 502a sets the initial product image set to correspond to the $1^{st}$ layer product image set.

According to various embodiments of the present disclosure, the search sub-module 502b searches for product images that are similar in one or more characteristics to one or more initial product images in the initial product image set. In some embodiments, determination of whether a product images is similar in one or more characteristics to one or more initial product images in the initial product image set is made according to a similarity threshold. For example, the search sub-module 502b searches for product images that having a similarity to the current initial product images in one or more of a color, a style, a texture, and/or the like that is greater than or equal to a preset similarity threshold value. In some embodiments, the search sub-module 502b obtains a search product image set according to the search for product images that are similar in one or more characteristics to one or more initial product images in the initial product image set. In some embodiments, the search product image set includes found product images and the similarities of the found product images to the current initial product images.

According to various embodiments of the present disclosure, the selecting module 502c selects next round search product images from the search product image set. As an example, the next round search product images refers to or otherwise includes product images that are not characterized as uninteresting to the user and have not been regarded as current initial product images.

According to various embodiments of the present disclosure, the adding module 502d adds selected next round search product images to the display product image set. In some embodiments, the adding module 502d sequentially regards selected next round search product images as current initial product images. In some embodiments, the adding module 502d searches for product images that are similar in one or more characteristics to one or more next round search product images (e.g., one or more images from the Nth layer product image set) according to a similarity threshold. For example, the adding module 502d searches for product images that have a similarity in a color, a style, a texture, and/or the like to current initial product images that is greater than or equal to a preset similarity threshold value.

Figure 5C:
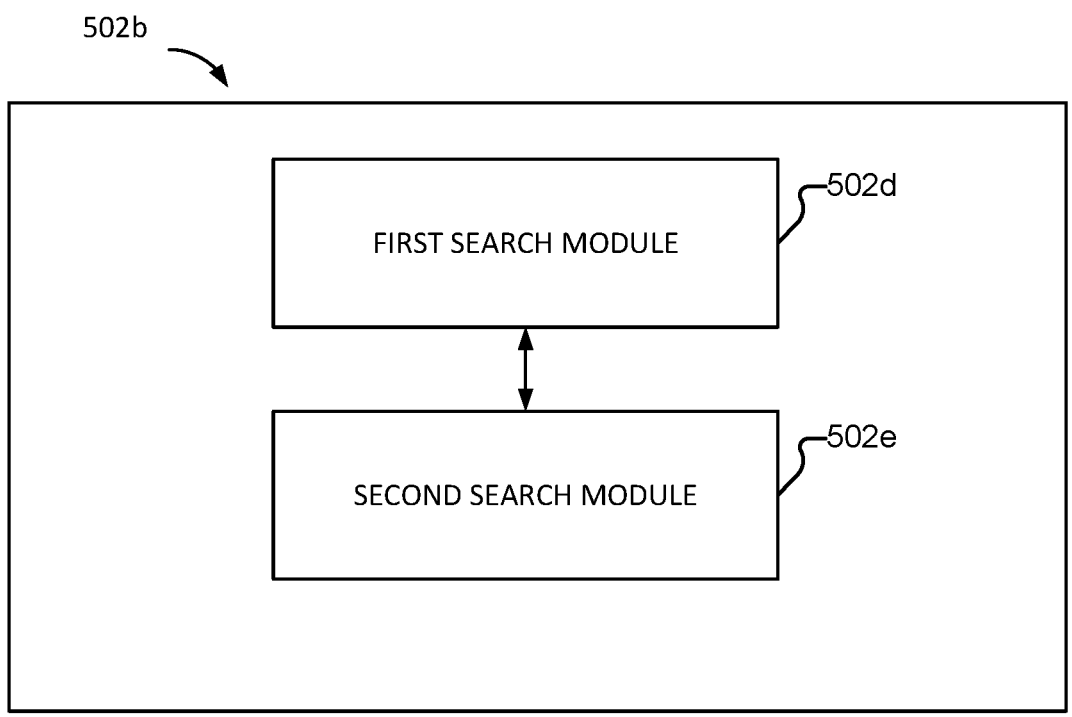
FIG. 5C is a structural diagram of a search module of a device for searching for and displaying product images according to various embodiments of the present application.

FIG. 5C is a structural diagram of a search module of a device for searching for and displaying product images according to various embodiments of the present application.

Referring to FIG. 5C, a search sub-module 502b of a device for searching for and displaying product images is provided. In some embodiments, the search sub-module 502b corresponds to search sub-module 502b illustrated in FIG. 5B. In some embodiments, the search sub-module 502b corresponds to search module 502 illustrated in FIG. 5A.

In some embodiments, the search sub-module 502b includes a first search module 502e, a second search module 502f, and/or the like.

According to various embodiments of the present disclosure, the first search module 502e uses a preset color, a preset style, a preset texture, or the like search device to perform an online search for product images having a similarity in a color, a style, a texture, and/or the like to the current initial product images that is greater than or equal to a preset similarity threshold value. In some embodiments, first search module 502e obtains the search product image set. For example, the first search module 502e obtains the search product image set according to the online search for product images having a similarity in a color, a style, a texture, and/or the like to the current initial product images that is greater than or equal to a preset similarity threshold value.

According to various embodiments of the present disclosure, the second search module 502f uses identifying numbers of current initial product images as a basis for searching a similar product image cache library for product images having a similarity in a color, a style, a texture, and/or the like to the current initial product images that is greater than or equal to a preset similarity threshold value. In some embodiments, the second search module 502f obtains a search product image set. For example, second search module 502f obtains the search product image set according to the search for product images having a similarity in a color, a style, a texture, and/or the like to the current initial product images that is greater than or equal to a preset similarity threshold value that uses identifying numbers of current initial product images as a basis for searching a similar product image cache library for product images. The similar product image cache library stores previously searched and found information on product images that are similar in color, style, and/or texture.

According to various embodiments of the present disclosure, the search module 502 includes a determining unit and a notifying unit.

In some embodiments, the determining module in the search module 502 determines whether the search layer number of the current initial product images is less than a preset layer quantity threshold value and/or whether the number of product images included in the display product image set is less than a preset image quantity threshold value.

In some embodiments, the notifying module of the search module 502 notifies, if the search layer number of the current initial product images is less than a preset layer quantity threshold value and/or the number of product images included in the search product image set is less than a preset image quantity threshold value, the search unit to execute the step of searching for product images whose similarity in a color, a style, a texture, and/or the like to the current initial product images is greater than or equal to a preset similarity threshold value.

Referring back to FIG. 5A, the communication module 503 operatively displays the product images in the display product image set to the user. In some embodiments, the communication module 503 sends one or more images of the display product image set to a terminal. For example, the communication module 503 sends at least a subset of the display product image set to the terminal via a product image interface. In some embodiments, the communication module 503 includes a selecting module, a display module, and/or the like.

In some embodiments, the selecting module of the communication module 503 includes a preset number of product images sequentially in turns from among product images corresponding to each initial product image in the display product image set and forming a product image list. In some embodiments, the product images corresponding to each initial product image refers to or otherwise includes a series of product images obtained by searching each initial product image as a direct search ontological object or an indirect search ontological object.

In some embodiments, the display module of the communication module 503 operatively displays the product images in the product image list to the user. For example, the display module of the communication module 503 sends one or more of the product images in the product image list to a terminal (e.g., via a network connection).

Figure 6:
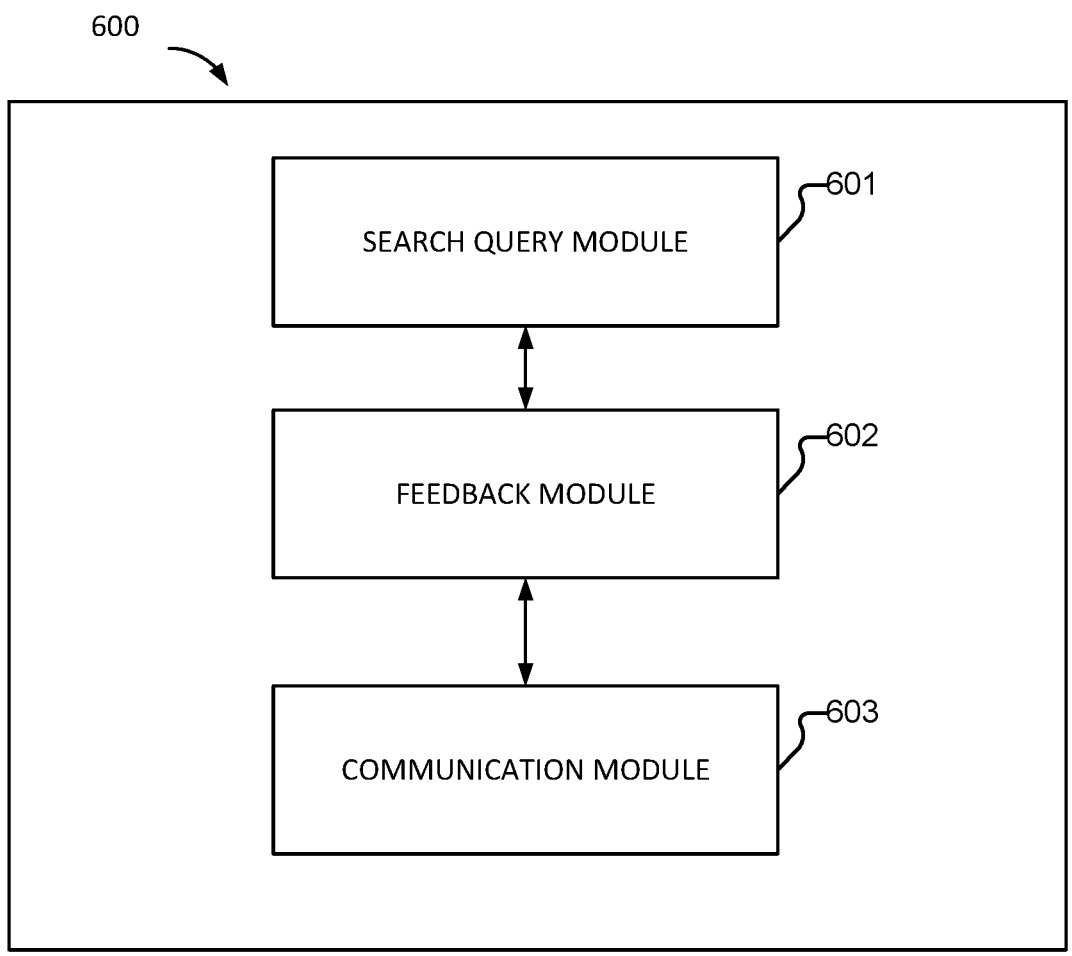
FIG. 6 is a structural diagram of a device for searching for and displaying product images according to various embodiments of the present application.

FIG. 6 is a structural diagram of a device for searching for and displaying product images according to various embodiments of the present application.

Referring to FIG. 6, the device 600 for searching for and displaying product images is provided. In some embodiments of the present disclosure, device 600 implements process 300 of FIG. 3.

In some embodiments, the device 600 includes a search query module 601, a feedback module 602, a communication module 603, and/or the like.

In some embodiments, search query module 601 operatively sends a product search query to a server. In some embodiments, the product search query includes parameters associated with a product search. For example, the product search parameters include a product name, a brand name, a color, a size, a shape, a texture, the like, or a combination thereof of a product. In some embodiments, the search query module 601 sends the product search query to the server via a communication network (e.g., the internet, and/or the like). In some embodiments of the present disclosure, the product search query corresponds to a product search. In some embodiments of the present disclosure, the search query module 601 sends one or more characteristics associated with the user (e.g., products purchased by the user, product images selected or otherwise identified as being interesting by the user, product images bookmarked by the user, and/or the like) to the server. In some embodiments, the search query module 601 sends, to the server, input relating to an interest in a product. The search query module 601 sends input to the server via a product image interface.

In some embodiments, feedback module 602 operatively sends product image feedback. For example, the feedback module 602 sends product image feedback to the server. In some embodiments, the feedback module 602 sends the product image feedback via the product image interface. In some embodiments, the feedback module 602 sends product image feedback in response to receiving one or more product images (e.g., found product images) that the terminal receives from the server while the server searches for similar product images. For example, the terminal sends the product image feedback while the server searches for similar product images.

In some embodiments, the communication module 603 receives found product images. In some embodiments, the communication module 603 receives the found product images from the server. In some embodiments, communication module 603 receives a subset of the found product images from the server. In some embodiments, communication module 603 receives one or more of the found product images from the server via the product image interface.

Figure 7:
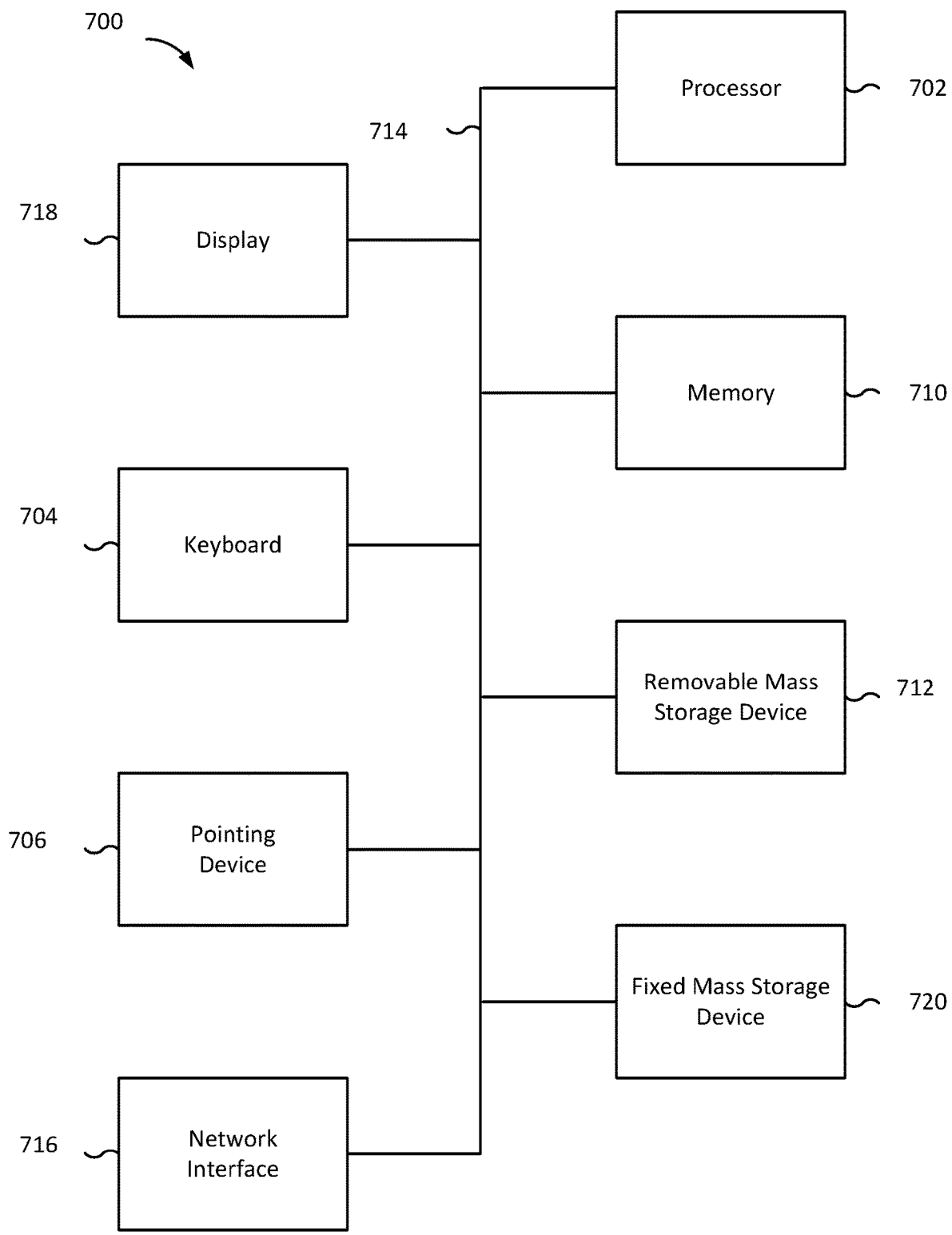
FIG. 7 is a functional diagram of a computer system for searching for and displaying product images according to various embodiments of the present application.

FIG. 7 is a functional diagram of a computer system for searching for and displaying product images according to various embodiments of the present disclosure.

Referring to FIG. 7, a computer system 700 for accessing a website or for determining whether a terminal accessing the website is a mobile terminal is provided. As will be apparent, other computer system architectures and configurations can be used to implement video calls. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The processes or steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

The device for searching for and displaying product images as described may include various modules for acquiring an initial product image set for a user; for searching for product images that are similar in a color, a style, texture, and/or the like to initial product images in an initial product image set, and for displaying the found product images to the user. The initial product image set comprises images which meet user expectations and that, during the search, are based on information such as color, style, and/or texture, the information such as color, style, and/or texture being highly related to the product images, thus increasing the relatedness of the product images that are searched for and displayed. A preset number of product images that are selected sequentially in turns from product images corresponding to each initial product image in the display product image set is selected. A product image list is formed, and the product images in the product image list are displayed to the user. The product images are displayed in uniform fashion, thus enhancing the product image display effect.

Some preferred embodiments of the present application were depicted and described in the description above. However, as stated above, please understand that the present application is not limited to the forms disclosed in this document. They should not be regarded as excluding other embodiments, but may be used in various other combinations, modifications, and environments. Moreover, within the scope of the inventive concept described in this document, they can be modified using the guidelines described above or with related art or knowledge. And if the modifications or changes made by persons skilled in the art do not depart from the spirit and scope of the present application, then they shall be within the protective scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for searching for and displaying product images, the method comprising:
    obtaining, by one or more processors, a product search query;
    acquiring, by one or more processors, an initial product image set for a user based at least in part on the product search query and historical information pertaining to the user wherein the initial product image set includes a product image corresponding to a product purchased by the user, a product image characterized as interesting by the user, a product image bookmarked by the user, or a combination thereof;
    searching, by one or more processors, for a second product image set for the user, wherein the searching for the second product image set is based at least in part on the initial product image set, and the second product image set comprises one or more product images that are similar in one or more characteristics to the initial product images in the initial product image set;
    sending, by one or more processors, the second product image set to be displayed to the user;
    receiving, by one or more processors, user input with respect to a selection of an image indicated as interesting by the user in the second product image set;
    searching, by one or more processors, for a third product image set for the user, wherein the searching for the third product image set is based at least in part on a set of images comprised in the second product image set and the selection of the image indicated as interesting by the user in the second product image set, and the third product image set comprises one or more images that are similar in one or more characteristics to the set of images comprised in the second product image set, wherein the initial product image set is not directly used in connection with searching for the third product image set; and
    sending, by one or more processors, the third product image set to be displayed to the user.

2. The method as described in claim 1, wherein the one or more characteristics corresponds to a color, a style, a shape, a texture, or a combination thereof.

3. The method as described in claim 1, wherein the searching for product images that are similar in one or more characteristics to the initial product images in the initial product image set comprises:
    specifying the initial product images in the initial product image set as current initial product images;
    searching for product images that are similar to the current initial product images in one or more characteristics, wherein a product image that is similar to the current initial product images in one or more characteristics has a similarity value that is greater than or equal to a preset similarity threshold value;
    obtaining a search product image set, wherein the search product image set comprises found product images and similarities of the found product images to the current initial product images;
    selecting product images for a next round of search from the search product image set, wherein product images for the next round of search include product images that are not characterized as uninteresting to the user and that have not been regarded as current initial product images;
    adding the selected next round search product images to a display product image set;
    specifying the selected next round search product images as the current initial product images; and
    searching for product images that are similar in one or more characteristics to the current initial product images, wherein a product image that is similar to the current initial product images in one or more characteristics has a similarity value that is greater than or equal to the preset similarity threshold value;
    wherein the sending of the found product images to the user comprises sending one or more of the product images in the display product image set to the user.

4. The method as described in claim 3, wherein searching for product images that are similar in one or more characteristics to the current initial product images, wherein a product image that is similar to the current initial product images in one or more characteristics has a similarity value that is greater than or equal to the preset similarity threshold value and the obtaining of the search product image set comprises:
    searching for product images that are similar in color, style, or texture to the current initial product images wherein a product image that is similar in color, style, or texture to the current initial product images has a similarity value that is greater than or equal to the preset similarity threshold value and obtaining the search product image set.

5. The method of claim 3, wherein searching for product images that are similar in one or more characteristics to the current initial product images, wherein a product image that is similar to the current initial product images in one or more characteristics has a similarity value that is greater than or equal to the preset similarity threshold value and the obtaining of the search product image set comprises:

using identifying numbers of the current initial product images as a basis for searching a similar product image cache library for product images that are similar in one or more characteristics to the current initial product images, wherein a product image that is similar to the current initial product images in one or more characteristics has a similarity value that is greater than or equal to the preset similarity threshold value and obtaining the search product image set, wherein the similar product image cache library stores previously searched and found information on product images that are similar in one or more characteristics.

6. The method as described in claim 3, further comprising:
determining one or more of whether a search layer number of the current initial product images is less than a preset layer quantity threshold value and whether a number of product images included in the display product image set is less than a preset image quantity threshold value; and
in response to determining that the search layer number of the current initial product images is less than the preset layer quantity threshold value or the number of product images included in the display product image set is less than the preset image quantity threshold value, searching for product images that are similar to the current initial product images in one or more characteristics, wherein a product image that is similar to the current initial product images in one or more characteristics has a similarity value that is greater than or equal to the preset similarity threshold value.

7. The method as described in claim 3, wherein the sending the one or more product images in the display product image set to the user comprises:
selecting a preset number of product images sequentially in turn from among product images corresponding to each the initial product image in the display product image set;
generating a product image list, wherein the product images corresponding to each of the initial product images refer to a series of product images obtained by searching each of the initial product images as a direct search ontological object or an indirect search ontological object; and
sending the product images in the product image list to the user.

8. The method of claim 1, wherein the searching for the third product image set comprises:
iteratively searching for a set of product images based on an immediately previous set of product images obtained in connection with the search for the third product image set.

9. The method of claim 8, wherein the iteratively searching is performed until a number of iterative searches is greater than a preset search threshold or a number of searched images is greater than a preset image quantity threshold.

10. The method of claim 1, wherein the second product image set is further searched based at least in part on whether the user has previously identified an image as uninteresting.

11. The method of claim 1, wherein the third product image set excludes a subset of images of the second product image set that are determined to be deemed as uninteresting by the user.

12. The method of claim 11, wherein the user input with respect to the second product image set is indicative of the subset of images of the second product image set that are determined to be deemed as uninteresting by the user.

13. The method of claim 1, wherein the initial product image set comprises direct search ontological objects with respect to the product search query, and the second product image set and the third product image set comprise indirect search ontological objects with respect to the initial product image set.

14. A device for searching for and displaying product images, the device comprising:
one or more processors configured to:
obtain a product search query;
acquire an initial product image set for a user based at least in part on the product search query and historical information pertaining to the user wherein the initial product image set includes a product image corresponding to a product purchased by the user, a product image characterized as interesting by the user, a product image bookmarked by the user, or a combination thereof search for a second product image set for the user, wherein the searching for the second product image set is based at least in part on the initial product image set, wherein the second product image set comprises one or more product images that are similar in one or more characteristics to the initial product images in the initial product image set;
send the second product image set to be displayed to the user;
receive user input with respect to a selection of an image indicated as interesting by the user in the second product image set;
search for a third product image set for the user, wherein the searching for the third product image set is based at least in part on a set of images comprised in the second product image set and the selection the image indicated as interesting by the user in the second product image set, and the third product image set comprises one or more images that are similar in one or more characteristics to the set of images comprised in the second product image set, wherein the initial product image set is not directly used in connection with searching for the third product image set; and
send the third product image set to be displayed to the user
one or more memories coupled to the one or more processors, configured to provide the one or more processors with instructions.

15. The device as described in claim 14, wherein the one or more characteristics corresponds to a color, a style, a shape, a texture, or a combination thereof.

16. The device as described in claim 14, wherein the one or more processors are further configured to:
specify the initial product images in the initial product image set as current initial product images;
search for product images that are similar to the current initial product images in one or more characteristics, wherein a product image that is similar to the current initial product images in one or more characteristics has a similarity value that is greater than or equal to a preset similarity threshold value;
obtain a search product image set, wherein the search product image set comprises found product images and similarities of the found product images to the current initial product images;

select product images for a next of search from the search product image set, wherein product images for the next of search include product images that are not characterized as uninteresting to the user and that have not been regarded as current initial product images;

add the selected next round search product images to a display product image set;

specify the selected next round search product images as the current initial product images; and search for product images that are similar in one or more characteristics to the current initial product images, wherein a product image that is similar to the current initial product images in one or more characteristics has a similarity value that is greater than or equal to the preset similarity threshold value, wherein the device comprises a display unit that is configured to send the product images in the display product image set to be displayed to the user.

17. The device as described in claim 16, wherein to search for product images that are similar in one or more characteristics to the current initial product images, wherein a product image that is similar to the current initial product images in one or more characteristics has a similarity value that is greater than or equal to the preset similarity threshold value and the obtaining of the search product image set comprises:

searching for product images that are similar in color, style, or texture to the current initial product images wherein a product image that is similar in color, style, or texture to the current initial product images has a similarity value that is greater than or equal to the preset similarity threshold value and obtaining the search product image set.

18. The device as described in claim 16, wherein to search for product images that are similar in one or more characteristics to the current initial product images, wherein a product image that is similar to the current initial product images in one or more characteristics has a similarity value that is greater than or equal to the preset similarity threshold value and the obtaining of the search product image set comprises:

use identifying numbers of the current initial product images as a basis for searching a similar product image cache library for product images that are similar in color, style, or texture to the current initial product images, wherein a product image that is similar in color, style, or texture to the current initial product images has a similarity value is greater than or equal to the preset similarity threshold value and obtaining the search product image set, wherein the similar product image cache library stores previously searched and found information on product images that are similar in color, style, texture, or a combination thereof.

19. The device as described in claim 16, wherein one or more processors are further configured to:

determine one or more of whether a search layer number of the current initial product images is less than a preset layer quantity threshold value and whether a number of product images included in the display product image set is less than a preset image quantity threshold value; and in response to determining that the search layer number of the current initial product images is less than the preset layer quantity threshold value or the number of product images included in the display product image set is less than the preset image quantity threshold value, search for product images that are similar in one or more characteristics to the current initial product images, wherein a product image that is similar to the current initial product images in one or more characteristics has a similarity value that is greater than or equal to the preset similarity threshold value.

20. The device as described in claim 16, wherein the one or more processors are further configured to:

select a preset number of product images sequentially in turn from among product images corresponding to each of the initial product images in the display product image set; and generate a product image list, wherein the product images corresponding to each of the initial product images refer to a series of product images obtained by searching each of the initial product images as a direct search ontological object or an indirect search ontological object; and send the product images in the product image list to be displayed to the user.

21. A computer program product, the computer program product being embodied in a non-transitory computer readable storage medium and comprising computer instructions for:

obtaining, by one or more processors, a product search query;

acquiring, by one or more processors, an initial product image set for a user based at least in part on the product search query and historical information pertaining to the user wherein the initial product image set includes a product image corresponding to a product purchased by the user, a product image characterized as interesting by the user, a product image bookmarked by the user, or a combination thereof;

searching, by one or more processors, for a second product image set for the user, wherein the searching for the second product image set is based at least in part on the initial product image set, wherein the second product image set comprises one or more product images that are similar in one or more characteristics to the initial product images in the initial product image set, wherein the initial product image set is not directly used in connection with searching for the third product image set;

sending, by one or more processors, the second product image set to be displayed to the user;

receiving, by one or more processors, user input with respect to a selection of an image indicated as interesting by the user in the second product image set;

searching, by one or more processors, for a third product image set for the user, wherein the searching for the third product image set is based at least in part on a set of images comprised in the second product image set and the selection of the image indicated as interesting by the user in the second product image set, and the third product image set comprises one or more images that are similar in one or more characteristics to the set of images comprised in the second product image set; and sending, by one or more processors, the third product image set to be displayed to the user.

* * * * *